(12) United States Patent
Liao et al.

(10) Patent No.: US 9,038,258 B2
(45) Date of Patent: May 26, 2015

(54) PIPE COUPLING AND METHOD OF FORMING THE SAME

(71) Applicants: Larry Liao, Fontana, CA (US); Chuck Clark, Stockton, CA (US)

(72) Inventors: Larry Liao, Fontana, CA (US); Chuck Clark, Stockton, CA (US)

(73) Assignee: J-M MANUFACTURING COMPANY, INC., Los Angeles, CA (US)

( * ) Notice: Subject to any disclaimer, the term of this patent is extended or adjusted under 35 U.S.C. 154(b) by 0 days.

(21) Appl. No.: 13/671,844

(22) Filed: Nov. 8, 2012

(65) Prior Publication Data

US 2013/0113208 A1   May 9, 2013

Related U.S. Application Data

(60) Provisional application No. 61/557,402, filed on Nov. 8, 2011.

(51) Int. Cl.
*B23P 11/00* (2006.01)
*F16L 19/06* (2006.01)
*F16L 37/092* (2006.01)

(52) U.S. Cl.
CPC ............ *F16L 19/06* (2013.01); *F16L 37/0925* (2013.01)

(58) Field of Classification Search
USPC ............ 285/339, 104, 232, 374; 29/447, 450, 29/453
See application file for complete search history.

(56) References Cited

U.S. PATENT DOCUMENTS

| | | | | |
|---|---|---|---|---|
| 5,297,824 | A * | 3/1994 | Imhof et al. | 285/374 |
| 5,393,107 | A * | 2/1995 | Vobeck | 285/374 |
| 5,988,695 | A * | 11/1999 | Corbett, Jr. | 285/374 |
| 7,284,310 | B2 * | 10/2007 | Jones et al. | 285/374 |
| 7,537,248 | B2 * | 5/2009 | Jones et al. | 285/339 |
| 7,815,225 | B2 * | 10/2010 | Jones et al. | 285/339 |
| 7,845,686 | B2 * | 12/2010 | Steinbruck | 285/321 |
| 8,544,851 | B2 * | 10/2013 | Holmes et al. | 285/374 |

* cited by examiner

*Primary Examiner* — David E Bochna
(74) *Attorney, Agent, or Firm* — Dentons US LLP

(57) ABSTRACT

A sealing and restraint mechanism operable to couple pipes having a restraint mechanism with a cavity formed in an interior region, and a gripping insert operable to be received within the cavity. The cavity of the restraint mechanism is at least partially defined by a stop and a shoulder. The gripping insert is operable to slide along the cavity and between the stop and the shoulder of the restraint mechanism such that, when the gripping insert slides toward the stop, the gripping insert is biased toward one of the pipes by the restraint mechanism.

14 Claims, 4 Drawing Sheets

PIPE COUPLING AND METHOD OF FORMING THE SAME

CROSS-REFERENCE TO RELATED APPLICATION

This Patent Application claims priority to U.S. Patent Application Ser. No. 61/557,402 filed Nov. 8, 2011 and titled Pipe Coupling And Method Of Forming The Same, the entire contents of which is incorporated herein by reference in its entirety.

BACKGROUND OF THE INVENTION

1. Field

This invention relates generally to the field of extruded plastic pipes and, in particular, to a method for incorporating a sealing system to connect such pipes.

2. Discussion of Related Art

PVC pipes have been used in delivering water to homes for decades. Easy installation, durability, and low prices have made it the most popular choice for contractors. An ASTM Standard published in 1993, describes the materials, requirements, and method of pressure rating PVC, and assigning to that product the material designation PVC-O, for oriented PVC. The Standard acknowledges that circumferential expansion of a PVC pipe results in orientation of the polymer molecules. This increases hoop tensile strength, which in the plastic pipe industry typically is measured by hydrostatic pressure rupture regression testing, Test procedures are given in the Standard for determining a categorized measure of the long-term hydrostatic strength of the PVC-O material (called Hydrostatic Design Basis). A pressure rating is assigned to the pipe itself based on wall thickness, diameter, and Hydrostatic Design Basis.

The Standard further indicates that a relationship exists between the expansion ratio and wall thickness ratio of the expanded pipe, and the long-term hydrostatic strength of the product. Wall thickness ratio refers to the ratio of the starting pipe wall thickness to that of the finished PVC-O pipe; expansion ratio is the ratio of the original to finished outside diameters. So, uniform expansion from a diameter of D to a diameter of 2D, with no change in material density, requires a thickness from T to T/2. The expansion ratio in this case is 0.5 and the wall thickness ration is 2.0.

Pipes formed from thermoplastic materials, including polyethylene, polypropylene and PVC, are used in a variety of industries. To form a joint between two sections of different pipes, the spigot or "male" pipe end is inserted into the socket or "female" pipe end. An annular, elastomeric sealing ring or gasket is typically seated within a groove formed in the socket end. As the spigot is inserted within the socket, the gasket provides the major seal capacity for the joint. To accommodate the aforementioned sealing ring, the socket will include an internal ring groove, typically formed by stretching the socket end over a uniquely shaped mandrel enlarged circumferentially to form an annular groove that will house the sealing ring.

The manufacture of the mating sections typically involves reformation by reheating and shaping the socket to the desired profile. The art of ebbing sockets (also called bells) on plastic pipes is well established, and there are various methods to do so. For example, a "Rieber" joint employs a combined mold element and sealing ring operable to seal a joint between a socket end and a spigot end of two cooperating pipes formed from thermoplastic materials. In the Rieber process, an elastomeric gasket is installed within a simultaneously formed internal groove in the socket end of a female pipe during a pipe belling process.

Nevertheless, the resonation of oriented materials can be problematical because the material will tend to revert if reheated. The oriented molecular structure, which in itself is created by a deformation process, will be lost. Furthermore, the deformation processes applied to the socket may alter the orientation level in such a way that the strength or other mechanical properties of the material are adversely affected.

As previously discussed, PVC pipes have been used in various water applications since the mid 1950s. Along with advancements in pipe construction, advancements have also been made in the sealing systems being utilized. Gaskets or "rings" that were once inserted by hand into a finished piece of pipe are now inserted by a machine as a "bell" is being formed. These flimsy pieces of rubber material have been replaced with rigid, sturdy, yet pliable material engineered to withstand hundreds of pounds of pressure through decades of service. In some instances, metal components are utilized along with the rubber gasket to create a virtually inseparable joint.

New materials are being utilized in the construction of PVC pipe, and with those new materials come new challenges in the manufacturing process. PVC-O, an example of a molecularly oriented pipe ("MOP"), presents different types of challenges due to its unusual construction. One of the most difficult challenges involves the "belling" process in which one end of the pipe is formed into a socket or female end, which in turn allows a spigot or male end to be inserted. The molecular properties of PVC-O make it extremely difficult to bell the pipe using current processes.

During the belling operation, the heated pipe end is forced over a forming mandrel, which typically has a sealing ring mounted about the mandrel. It is necessary to deform the heated pipe end as it passes over the forming mandrel to accommodate the sealing ring or other components. In some cases, the material of the MOP is already nearly stretched to its limit during pipe manufacture. When used in a Rieber belling process, the operation may alter the desired properties of the MOP or even cause the pipe to fail in certain cases.

Previously developed sealing gasket designs for PVC-O pipe have been shown to be effective sealing solutions for PVC-O in some instances, but they are unable to directly affect the scrap issue faced by manufacturers where MOP and particularly PVC-O pipe is not able to adequately withstand the stresses encountered during pipe-belling operations.

SUMMARY OF THE INVENTION

The following brief description is provided to indicate the nature of the subject matter disclosed herein. While certain aspects of the present inventive concept are described below, the summary is not intended to limit the scope of the present inventive concept. Embodiments of the present inventive concept provide a pipe coupling with a sealing system and a method for incorporating the sealing system into one or more pipes to connect and seal such one or more pipes. The present inventive concept does not suffer from and remedies the deficiencies of conventional pipe couplings such as those previously set forth herein.

The present inventive concept provides, in its simplest form, a solution to the aforementioned issues by incorporating a unique sealing and restraint mechanism within a belled end of a pipe for coupling with another pipe.

The aforementioned may be achieved in one aspect of the present inventive concept by providing a sealing and restraint mechanism operable to couple pipes together. The mechanism may include a restraint mechanism having a cavity formed in an interior region and/or a gripping insert operable to be received within the cavity. The cavity of the restraint mechanism may be at least partially be defined by a stop and a shoulder. The gripping insert may be operable to slide between the stop and the shoulder of the restraint mechanism. When the gripping insert slides toward the stop, the gripping insert may be biased toward one of the pipes by the restraint mechanism.

The biasing of the gripping insert toward the one of the pipes by the restraint mechanism when the gripping insert slides toward the stop may include simultaneously biasing the restraint mechanism against the other one of the pipes. The sealing and restraint mechanism may further include a sealing ring operable to simultaneously abut the restraint mechanism and the pipes to form a seal therebetween. The seal formed by the sealing ring may include (i) a first seal formed between the sealing ring and the one of the pipes, and/or (ii) a second seal formed between the sealing ring and the restraint mechanism.

The cavity may include a sloped surface extending from the stop. The sloped surface may be operable to bias the gripping insert against the other one of the pipes. The gripping insert may include a plurality of teeth operable to engage the one of the pipes. The plurality of teeth of the gripping insert may be at least partially angled away from a horizontal axis defined by the one of the pipes at less than 90°. The restraint mechanism may include a plurality of teeth operable to engage the other one of the pipes. The sealing ring may include a reinforcing band embedded in a surface thereof and abutting the other on the pipes.

The aforementioned may be achieved in another aspect of the present inventive concept by providing a method of manufacturing a sealing and restraint mechanism. The method may include the steps of forming a groove in a first pipe, inserting a restraint mechanism having a cavity formed in an interior region in the groove, inserting a gripping insert within the cavity, and sliding a second pipe at least partially into the first pipe such that the gripping insert (i) is operable to slide toward the stop when the first pipe and the second pipe are pressured, and/or (ii) is biased toward the second pipe by the restraint mechanism. The cavity of the restraint mechanism may be at least partially defined by a stop and a shoulder. The gripping insert may be operable to slide between the stop and the shoulder of the restraint mechanism.

The biasing of the gripping insert toward the second pipe by the restraint mechanism when the gripping insert slides toward the stop may includes simultaneously biasing the restraint mechanism against the first pipe. The method may further include the step of inserting a sealing ring into the groove of the first pipe. The sealing ring may be operable to simultaneously abut the restraint mechanism and the first and second pipes to form a seal therebetween. The seal formed by the sealing ring may include (i) a first seal formed between the sealing ring and the first pipe, and/or (ii) a second seal formed between the sealing ring and the restraint mechanism.

In one embodiment of the invention, a pipe with a restraint system has a first longitudinal section of molecularly oriented pipe joined to a second longitudinal section of molecularly oriented pipe. Each of the longitudinal sections of molecularly oriented pipe has at least one bell and spigot end to be joined. The pipe is made up of a tubular body having an exterior surface, an interior surface, and opposing ends with openings which communicate with an initially open interior. A combination seal and restraint mechanism is located within the interior of the pipe adjacent to one of the respective end openings. The seal and restraint mechanisms include an annular sealing member and a companion gripping member to seal, grip, and restrain an end of a molecularly oriented pipe spigot. The pipe is formed of a different material than the molecularly oriented pipes. Preferably, the molecularly oriented pipe sections are formed of molecularly oriented PVC while the pipe is formed of plain PVC or reinforced PVC.

In another embodiment of the invention, a pipe bell is provided for joining two just longitudinal section of molecularly oriented and PVC pipe. Each of the longitudinal sections of molecularly oriented pipe has at least one plain spigot end for joining. A bell is provided, which receives and joins the first and second longitudinal sections of molecularly oriented pipe. In this embodiment, each sealing and restraint mechanism includes a sealing ring formed as an elastomeric body. The sealing ring and restraint mechanism are integrated during the manufacture of the belled pipe end. A companion restraint mechanism for the elastomeric sealing ring allows movement for the spigot pipe end relative to the belled end of the female pipe. Movement is allowed in a longitudinal direction but is restrained in a second, opposite relative direction.

The restraint mechanism in this case is composed with a ring shaped housing installed within the belled pipe end during manufacture. It has a circumferential interior region and a companion gripping insert which is contained within the interior region of the housing. The gripping insert has an exterior surface and an interior gripping surface with at least one row of dipping teeth for gripping the spigot end of the molecularly oriented pipe. The gripping insert is conveniently provided as a ring shaped member having at least one circumferential slit in the circumference. This allows the gripping insert to be temporarily compressed and installed within the housing in a snap-fit fashion after it has been integrally formed within the belled pipe end during the manufacture.

In assembling a pipe joint in accordance with embodiments of the invention, a bell of pipe is provided and each of the male spigot pipe ends of the molecularly oriented pipes is inserted within opposing end openings of the bell until the grips and seals form a secure connection. The finished pipe can installed onto one end to another at a field location.

Thus, in one embodiment of the present inventive concept, a PVC-O pipe, e.g., a plain PVC-O or a reinforced PVC-O, for joining one longitudinal section of molecularly oriented pipe, e.g., a plain PVC-O or a reinforced PVC-O, to another longitudinal section of molecularly oriented pipe is provided. Each longitudinal section of molecularly oriented pipe has at least one bell and spigot end. The pipe has formed an internal restraint mechanism in the bell end, being located within the internal grooves. The seal and restraint mechanism includes a grip housing for containing a gripping ring and the bell end of the pipe is formed over the sealing member and grip housing during manufacture.

Another embodiment of the present inventive concept provides a PVC-O restraint pipe joint, which includes a longitudinal section of PVC-O pipe having at least one bell and one spigot end, a Reiber gasket; a Bulldog casing; and a Bulldog insert, wherein each sealing and restraint mechanism includes a sealing ring formed as an elastomeric body, the sealing ring being integrally formed in the belled end of the pipe body during the manufacture of the joint. A companion restraint mechanism for the elastomeric sealing ring allows movement of the spigot pipe end relative to the belled end of the female pipe in a longitudinal direction. It is comprised of a ring shaped grip housing formed within the belled pipe end during its manufacture and has a circumferential interior region and a companion gripping insert which is contained within the circumferential interior region of the grip housing. The gripping insert has an exterior surface and an interior gripping surface with at least one row of gripping teeth. The pipe sections may be formed of a molecularly oriented material (e.g., PVC) and the pipe body may be formed of plain PVC or reinforced PVC. Alternatively, the pipe body may be formed of a material other than oriented molecularly pipe.

The gripping insert of the pipe joint may be a ring shaped member having at least one circumferential slit in the circumference thereof which allows the gripping insert to be temporarily compressed and installed within the circumferential interior region of the grip housing in snap-fit fashion after the ring shaped grip housing has been integrally installed within the belled pipe end during manufacture of the tubular body of the coupling. The seal and restraint mechanisms may each include a grip housing for the gripping ring and the pipe body may be formed over the sealing ring and grip housing during manufacturing.

Open-cut installations of C900/C905 PVC for new potable water systems have been a proven methodology for many years. Creating PVC pipe with improved hydrostatic stress ratings through expansion and orientation of the polymer (PVC-O) and installing rubber gaskets after pre-formed bell ends of pipes before being applied to hydro-tester processes are also established methodologies. Conventional PVC-O pipe is expanded in an internal groove on the bell end of a pipe during the belling operations. Installation of the rubber gaskets (CI BC rings) is next. During this conventional process, knuckle marks are left on the bell end which creates possibilities of leakage. Advantages of this technology are captured in a new rehabilitation system: PVC pipes formed with a combined sealing and restraint mechanism located in the bell end of the molecularly oriented pipe. Because the pipe is made of a material such as ordinary PVC, the sealing and restraint mechanisms can be formed in the bell end during normal belling operations without introducing unacceptable levels of stress or strain onto the product. The knuckle marks are also eliminated.

Development of the product and system of the present inventive concept require three technical accomplishments, i.e., producing consistent heated water, expanding the inserted swedge mandrel to the inside of the bell end of pipes, and releasing the air pocket on the Rieber mandrel.

Sealing and restraint mechanisms are described in U.S. Pat. Nos. 7,537,248 and 7,328,493, the disclosures of which are incorporated by reference in their entireties.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present inventive concept are described in detail below with reference to the attached drawing figures, wherein.

Figure 1:
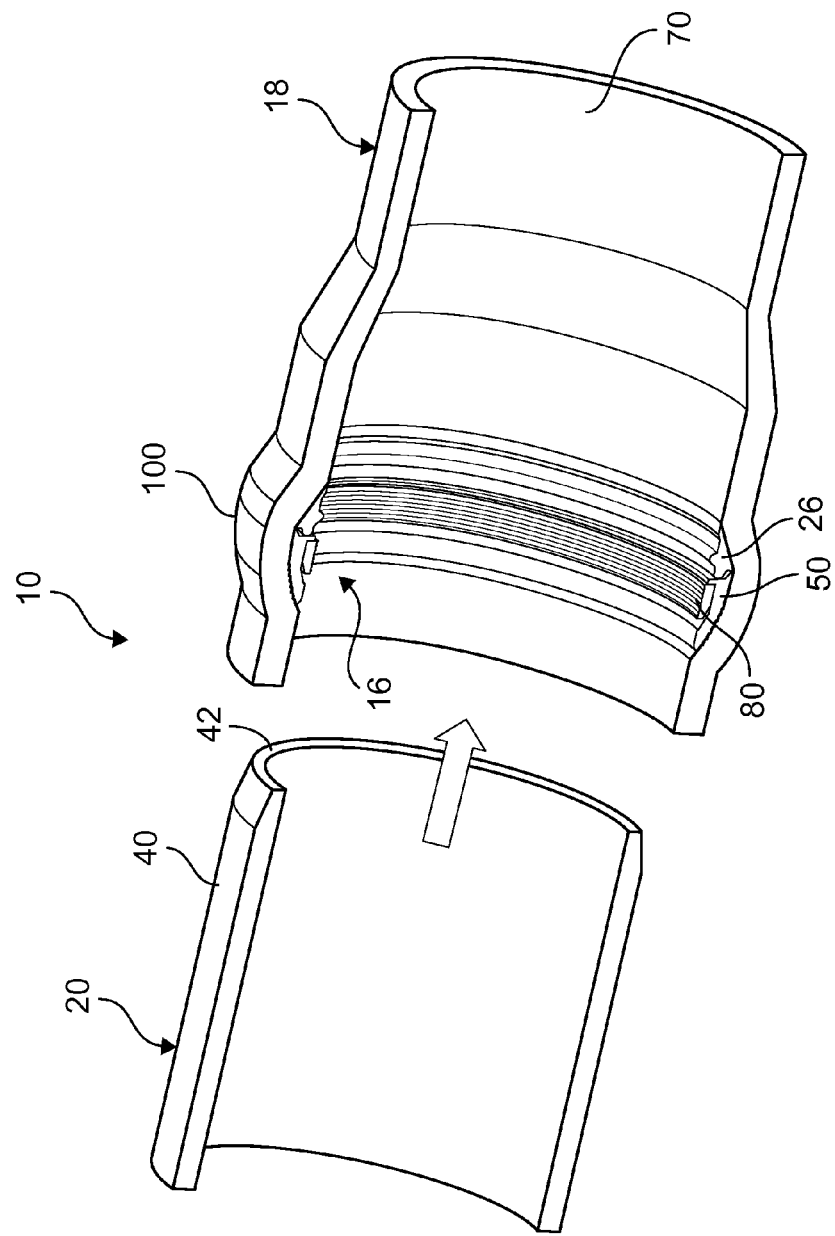
FIG. 1 is a partial, prospective view, partly broken away illustrating a pipe joint configured in accordance with an embodiment the present inventive concept in which a special a belled, female end of a pipe matingly receives a male spigot end of another pipe.
Figure 2:
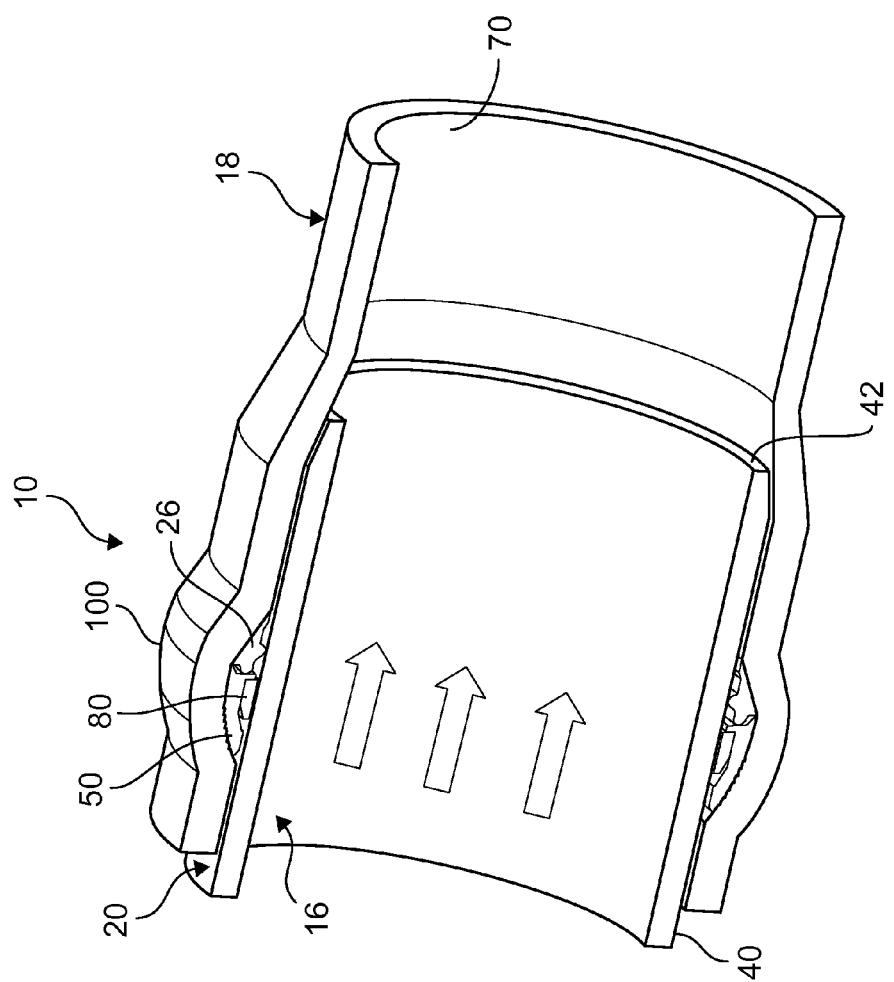
FIG. 2 is a partial, prospective view, partly broken away illustrating the pipe inserted into the female belled end along a longitudinal direction.

The drawing figures do not limit the present inventive concept to the specific embodiments disclosed and described herein. The drawings are not necessarily to scale, emphasis instead being placed upon clearly illustrating the principles of the present inventive concept.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIGS. 1-4B, the system 10 of the present general inventive concept is illustrated using a special belled PVC-O. It is foreseen, however, that any like material may be used without deviating from the scope of the present inventive concept. A seal and restraint mechanism 16 of the system 10 is operable to couple pipes 18 and 20 together. The seal and restraint mechanism 16 is integrated into the pipe 18 and includes an elastomeric, circumferential or annular sealing ring 26, which is termed as an elastomeric body. The annular sealing ring 26 is somewhat tear-drop shaped in cross section and includes a bulbous-end region 28 and a relatively thinner forward-most region 30, as illustrated in FIG. 4A. The bulbous-end region 28 terminates at a nose portion 32. The bulbous-end region 28 also includes an exposed exterior surface 34, which is operable to contact an exterior surface 40 of a mating spigot pipe end 42 of the pipe 20 of the MOP upon assembly of the seal and restraint mechanism 16 and coupling of the pipes 18, 20.

The sealing ring 26 is preferably made of a resilient elastomeric or thermoplastic material. The sealing ring 26 may be termed, for example, from natural or synthetic rubber, such as SBR, or other elastomeric materials such as EPDM or nitrite rubber. It is foreseen, however, that any like material may be used without deviating from the scope of the present inventive concept.

Figure 4A:
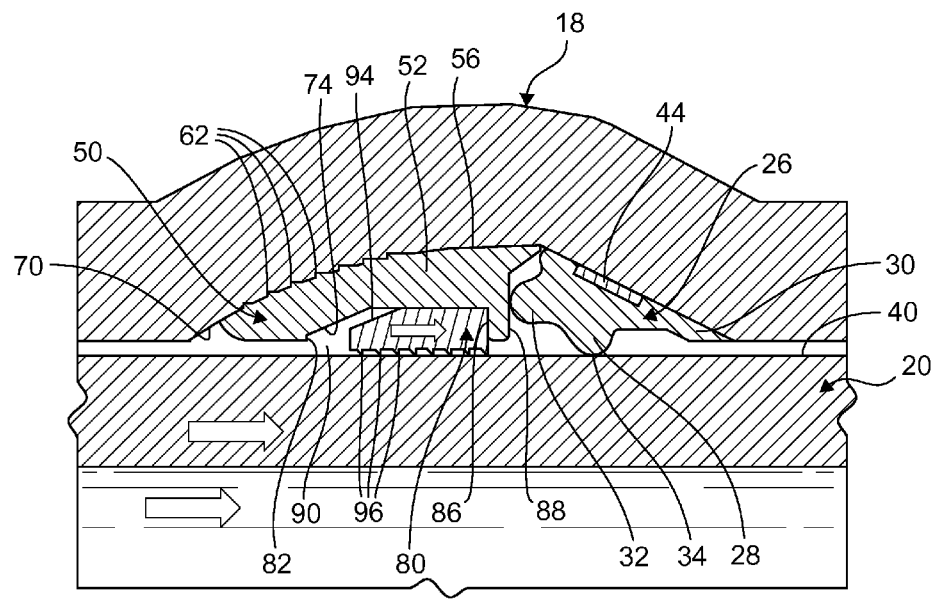
FIG. 4A is a side, cross-sectional view, illustrating a pipe inserted into another pipe having a gripping insert.
Figure 4B:
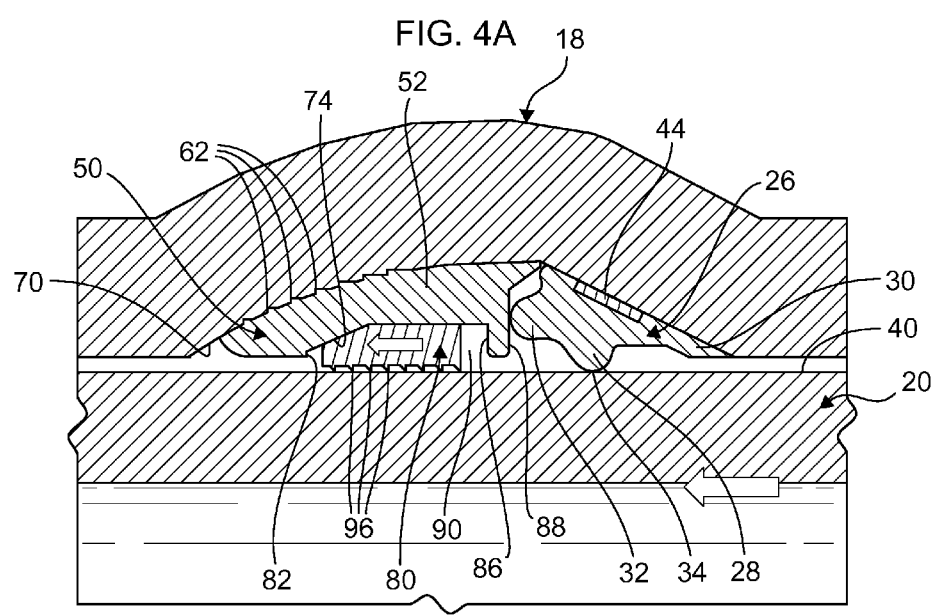
FIG. 4B is a side, cross-sectional view illustrating the pipe illustrated in FIG. 4A with opposing longitudinal direction after the pipe is pressurized, e.g., using water.

The sealing ring 26 includes a metal reinforcing band 44 that extends about the outer circumference of the sealing ring 26, as illustrated in FIGS. 4A and 4B. It is foreseen that any number of reinforcing bands 44 may be utilized to optimize the sealing and restraining properties of the system 10.

The seal and restraint mechanism 16, which is utilized in the pipe 20 of the present inventive concept, includes a companion restraint mechanism 50 operable to cooperate with the sealing ring 26 to allow movement of the mating male MOP spigot end 42 of the pipe 20 relative to the pipe 18 in a longitudinal direction. The companion restraint mechanism 50 includes a ring shaped housing 52 having a circumferential interior region 54 and an exterior region 56. The ring shaped housing 52 is operable to provide radial stability and reinforcement for the pipe 20 so that the pipe 20, adjacent to the male end 42, is radially supported throughout assembly of the pipes 18, 20 and thereafter.

The exterior region 56 extends from a nose region 60 in convex fashion, gradually flattening out into a planar back region which terminates in a tip region 62. The tip region 62 serves as a protective skirt which covers any gag between the sealing ring 26 and ring shaped housing 50 during the pipe belling operation.

Although the housing 52 could have a circumferential opening, it is preferably provided as a solid ring of a slightly larger internal diameter than the forming mandrel upon which it is received during pipe belling operations. It is foreseen, however, that the housing 52 could be used with some form of collapsible forming mandrel, in which case its internal diameter might approach or exceed that of the mandrel in certain of its states of operation. The exterior 56 of the housing 50 may be equipped with one or more rows of gripping teeth 62 operable to engage an internal surface 70 of the pipe 18. Friction between the gripping teeth 62 and the internal surface 70 of the pipe 18 is increased during the belling operation as the pipe 18 is heated. The ring shaped housing 50 is preferably formed of a material selected from the group consisting of metals, alloys, elastomers, polymeric plastics, and composites and is rigid or semi-rigid in nature.

A leading portion 74 of the circumferential interior region 54 is sloped upwardly with respect to the longitudinal axis of the pipe 18. This leading portion 74 forms an upwardly sloping ramp surface operable to slidably receive a companion ring-shaped gripping insert 80. The sloping ramp surface extends upwardly from a positive stop region 82 and gradually flattens into a planar circumferential region which terminates in an internal shoulder 86 arranged opposite an external shoulder 88. The positive stop region 82 is operable to prevent the companion gripping insert 80 from overly compressing the outer surface 40 of the male end 42 of the pipe 20 as the pipe joint is being assembled. A cavity 90 is formed in the housing 52 and between the positive stop region 82 and the internal shoulder 86 is operable to slidably receive the gripping insert 80 and provide a predetermined degree of movement of the gripping insert 80 within the cavity 90.

FIGS. 4A and 4B illustrate the positioning of the gripping insert 80, which is received in complimentary fashion and contained within the circumferential interior region 54 of the housing 52. A nose region of the gripping insert 80 is operable to contact the positive stop region 82 on the interior region 54 of the housing 52 when the gripping insert 80 moves from a backward-most position, as illustrated in FIG. 4A, to a forward-most position, as illustrated in FIG. 4B. The movement of the gripping insert 80 is caused during mating of the pipes 18, 20 when the gripping insert 80 contacts the pipe 20. The housing 52, via the positive stop region 82, is operable to assist in retaining the gripping insert 80 within the cavity 90 of the housing 52.

The gripping insert 80 includes an exterior surface 92 and an interior surface 94 with at least one row of gripping teeth 96. In the illustrated embodiment of the present inventive concept, the gripping insert 80 actually has four rows of teeth 96. The rows of teeth 96 are arranged for engaging selected points on the outer surface 40 of the pipe 20.

The interior surface 94 of the gripping insert 80 has a sloping profile that corresponds to and is operable to abuttingly contact the upwardly sloping ramp surface of the interior region 54 of the housing 52. Upon such contact with the interior region 54 of the housing 52, force created via the coupling of the pipes 18, 20 causes the gripping insert 80 to travel along the interior region 54 of the housing 52 at an angle while the gripping teeth 96 of the gripping insert 80 securely engage the outer surface 40 of the pipe 20. It is foreseen that the gripping teeth 96 of the gripping insert 80 may be of equal length or may vary in length and may be arranged in either a uniform or non-uniform manner about the gripping insert 80 relative to each other.

The gripping teeth 96 of the gripping insert 80 are also angled away from a horizontal axis of the joint at an angle of less than 90°. As will be appreciated from the drawings, the gripping insert 80 will typically be provided as a slit ring having a single slit in a circumference thereof. The gripping insert 80 is formed from a rigid or relatively rigid material including, but not limited to a hard metal, such as corrosion resistant stainless steel, or from other metallic materials or alloys or a hardened plastic or composite material, or the like. The slit in the circumference of the gripping insert 80 is operable to allow the gripping insert 80 to be compressed and snap-fit into the cavity 90 of the housing 52 after the housing 52 has been installed during the belling operation.

As illustrated in FIGS. 4A and 4B, the male end 42 of the pipe 20 is inserted into the pipe 20 to form the joint. FIG. 4A illustrates the gripping action of the gripping teeth 96 of the gripping insert 80 in which the gripping teeth 96 grip the outer surface 40 of the pipe 20. The gripping teeth 96 are angled inwardly with respect to a horizontal axis defined by the male end 42 of the pipe 20 so that contact with the male pipe 20 is operable to causes the gripping teeth 96 to be defected in a counterclockwise direction with respect to the axis while the pipe 20 is being inserted into the pipe 18 in a longitudinal direction, as illustrated in FIG. 4A. After the pipe 20 has been fully inserted, the gripping teeth 96 grip the exterior surface 92 of the pipe 20 and resist movement in a longitudinal direction opposite to the direction of insertion. The nose portion 32 of the sealing ring 26 is also operable to contact and form a sealing region between the sealing ring 26 and the external shoulder 44 of the housing 18.

In the Rieber process, which is preferably used to form the pipe 18 of the present inventive concept, the seal and restraint mechanism 16 is installed within a simultaneously formed internal groove 100 in the pipe 18 during the pipe belling process. In this manner, the pre-stressed and anchored seal and restraint mechanism 16 formed during the belling process at the pipe factory provides an improved socket end for the pipe joint with a sealing gasket that will not tend to twist or flip or otherwise allow impurities to enter the sealing zones of the joint formed between the pipes 18, 20, thereby increasing the reliability of the joint and decreasing the risk of leaks or possible failure due to abrasion.

Figure 3:
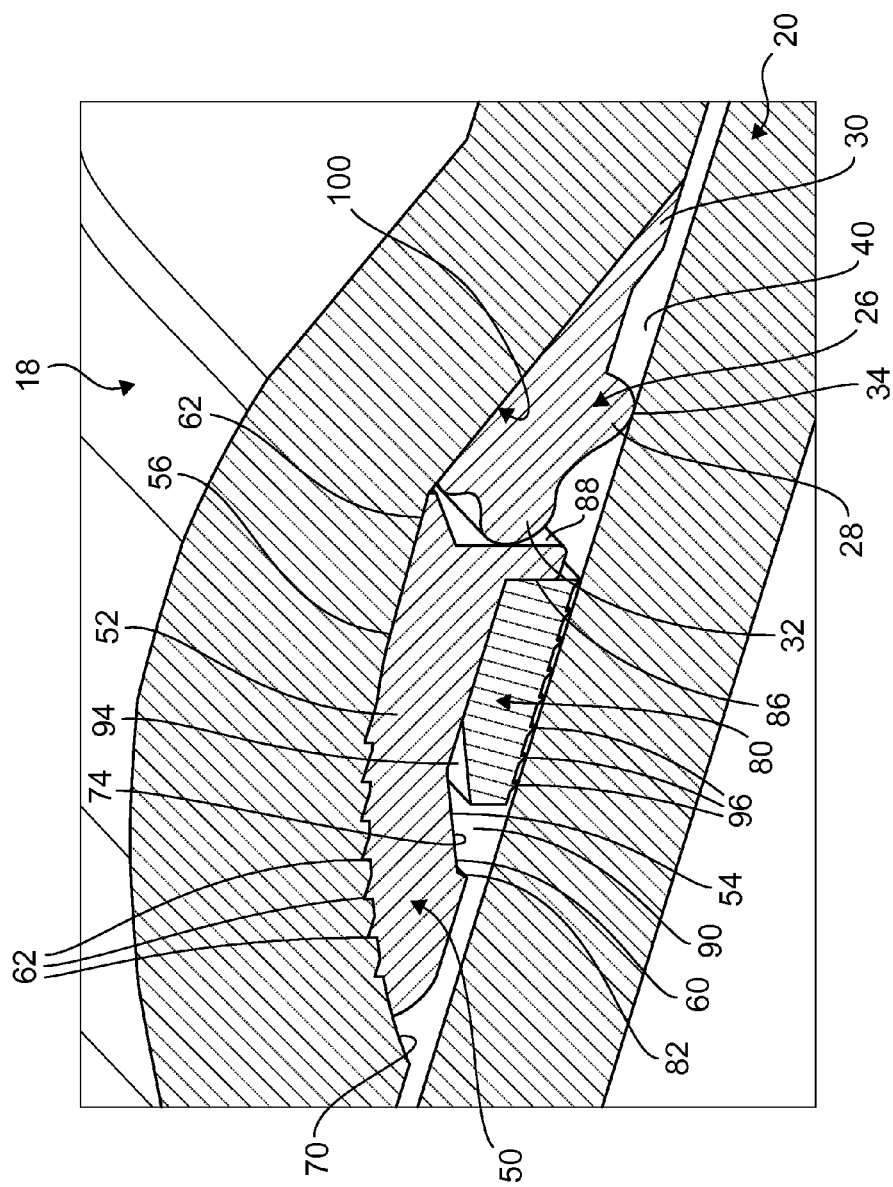
FIG. 3 is a detailed cross-sectional view of a portion of the pipe illustrated in FIG. 2 with a seal and restraint mechanism.

The methods of installing the aforementioned components of the system 10 of the present inventive concept will now be briefly described. In the preferred installation method, the sealing ring 26 and the ring shaped housing 52 are placed side by side on two stages of forming mandrels. A first swedge mandrel expands a bell end of the pipe 18 in a heating chamber. Next, the pipe 18 with the swedge belled end is rapidly moved over the seal and restraint mechanism 16, which has been pre-located on a mandrel in a second chamber, and formed to a certain profile with water heated to 208° F. A backup collar's position and the mandrel seating groove location and size may have to be adjusted to match the resulting changes in bell dimensions, which in turn provide sufficient space to accommodate the housing 52. Once the belled end of the pipe 18 has been cooled and the forming mandrel retracted, the gripping insert 80 can be snapped or popped into position on the interior circumference of the housing 52, as illustrated in FIG. 3.

The present inventive concept provides the system 10 with the sealing and restraint mechanism 16 in the pipe 18 operable to join MOP in which the sealing and restraint mechanism 16 is integral to the pipe 18 formed in the bell end openings of the joint. Because of the inherent restraint function achieved by the coupling of the pipes 18, 20, the same may advantageously be utilized in drilling applications for plastic drill pipe, such as in horizontal directional drilling, or "trenchless drilling" where MOP is utilized as a drill pipe. In the past, problems were encountered with the MOP sections pulling apart during drilling operations. This in part was due to the difficulties presented by the nature of the MOP. The use of the system 10 of the present inventive concept overcomes these problems.

Accordingly, the present inventive concept provides a solution to the aforementioned issues by incorporating a unique sealing and restraint mechanism within a belled end of a pipe for coupling with another pipe.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

The invention claimed is:

1. A method of manufacturing a PVC-O pipe having a sealing and restraint mechanism for coupling pipes, the method comprising the steps of:
    forming a belled end in a PVC-O pipe using a first mandrel;
    subsequently moving the belled end of the PVC-O pipe over a sealing and restraint mechanism that is located on a second mandrel, and applying heat from a heated water to the belled end of the PVC-O pipe and the sealing and restraint mechanism disposed within the belled end; and
    cooling the belled end of the PVC-O pipe having the sealing and restraint mechanism formed therein.

2. The method of claim 1, further comprising the step of retracting the second mandrel once the belled end of the PVC-O pipe has been cooled.

3. The method of claim 2, wherein the sealing and restraint mechanism includes a restraint mechanism having a housing and a gripping insert, and the method further comprises the step of:
    installing the gripping insert within the housing after the retracting step.

4. The method of claim 3, wherein:
    the housing includes a cavity in an interior region thereof,
    the cavity is at least partially defined by a stop and a shoulder, and
    the gripping insert is configured to slide within the cavity between the stop and the shoulder during coupling of the PVC-O pipe with another pipe via the sealing and restraint mechanism integrated into the PVC-O pipe.

5. The method of claim 4, wherein the gripping insert includes a plurality of teeth configured to engage the other pipe.

6. The method of claim 1, wherein in the forming step, the first mandrel is in a first heating chamber.

7. The method of claim 1, wherein the second mandrel is in a second chamber.

8. The method of claim 1, wherein the heated water is water heated to about 208° F.

9. The method of claim 1, wherein the PVC-O pipe is a molecularly-oriented pipe (MOP).

10. The method of claim 1, wherein the sealing and restraint mechanism includes a sealing ring and a restraint mechanism.

11. The method of claim 10, wherein the sealing ring abuts the restraint mechanism.

12. The method of claim 10, wherein the sealing ring is made of a thermoplastic or elastomeric material.

13. The method of claim 1, further comprising the step of coupling the PVC-O pipe with another pipe.

14. The method of claim 1, wherein the other pipe is another PVC-O pipe.

* * * * *